(12) United States Patent
Kyrtsos

(10) Patent No.: US 6,223,602 B1
(45) Date of Patent: May 1, 2001

(54) ELECTROMAGNETIC VIBRATION SENSOR

(75) Inventor: Christos T. Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/272,026

(22) Filed: Mar. 18, 1999

(51) Int. Cl.⁷ ..................................................... G01H 1/00
(52) U.S. Cl. ................... 73/660; 73/643; 73/655; 73/661; 73/657; 73/597
(58) Field of Search ............................ 73/661, 650, 655, 73/643, 598, 597, 599, 600, 592, 660, 657

(56) References Cited

U.S. PATENT DOCUMENTS

| | | | |
|---|---|---|---|
| 4,653,324 | * 3/1987 | Nugier | 73/460 |
| 4,698,491 | * 10/1987 | Lysen | 250/201 |
| 4,762,008 | * 8/1988 | Kobayashi et al. | 73/862.36 |
| 5,442,956 | * 8/1995 | Persson | 73/118.1 |
| 5,497,233 | 3/1996 | Meyer | 356/345 |
| 5,521,884 | 5/1996 | Humphries et al. | 367/140 |
| 5,553,514 | * 9/1996 | Walkowc | 74/574 |
| 5,641,904 | * 6/1997 | Kopp et al. | 73/593 |
| 5,705,757 | * 1/1998 | Wozniak | 73/862.338 |
| 5,955,674 | * 9/1999 | McGovern et al. | 73/650 |

FOREIGN PATENT DOCUMENTS

174909 * 7/1989 (JP).

* cited by examiner

*Primary Examiner*—Hezron Williams
*Assistant Examiner*—Nashmiya Fayyaz
(74) *Attorney, Agent, or Firm*—Carlson, Gaskey & Olds

(57) ABSTRACT

A drive line vibration sensor includes an emitter, a receiver, and a controller. The emitter and receiver are mounted in a differential manner such that drive line vibrations cause the emitter to vibrate at a different frequency than the receiver. In operation the emitter transmits a signal to the receiver such that the differential movement of the transmitter relative to the receiver produces a variation in the signal received by the receiver which is identifiable by the controller. In another embodiment, the emitter pulses the signal such that the frequency of the vibration can be determined. A recording device is preferably in communication with the controller to record the variation in the signal to provide an inexpensive diagnostic and maintenance system which can record the overall operation of a drive line under actual operational conditions.

16 Claims, 1 Drawing Sheet

ELECTROMAGNETIC VIBRATION SENSOR

BACKGROUND OF THE INVENTION

The present invention relates to an apparatus for detecting drive line system imbalances, and more particularly to a vibration sensor using electromagnetic signals to record the vibration experienced by a drive line component.

A drive shaft typically includes an elongated tubular member which is operatively coupled to the transmission and axle assembly through a pair of universal joints or other similar coupling disposed on either end of the shaft. Alternatively, the drive shaft may include two or more elongated tubular members which are connected together by a universal joint or some other similar coupling device and connected between the transmission and wheel assembly.

The individual components of the drive line system discussed above often include inherent or residual imbalances due to variations in manufacturing tolerances. While steps can be taken to balance the individual components, residual imbalances often still remain. It is further known to balance the drive line system prior to, and after, installation into the vehicle. Typically, such balancing is effective to practically eliminate objectionable vibration in the drive line system of a fully assembled vehicle. However, mechanical wear, residual imbalances, and road conditions may eventually lead to the disruption of the drive line balance. Vehicle drive line systems which become unbalanced are unacceptable as they produce drive line vibrations which could eventually lead to failure.

Accordingly, it is desirable to provide a vibration sensor which measures the quantity of vibration that the drive line component is exposed to and which can record the overall operation of a drive line under actual operational conditions.

SUMMARY OF THE INVENTION

The vibration sensor of the present invention is preferably fabricated using micro machining technology such that the sensor is an integrated circuit chip. Accordingly, the micro-machined vibration sensor can be readily located in many small inaccessible locations of a vehicle drive line. Of course, the sensor alternatively can be made by any technique.

The vibration sensor of the present invention generally includes an emitter, a receiver, and a controller. In operation the emitter transmits an electromagnetic signal to the receiver. The emitter and receiver are mounted in a differential manner such that drive line vibrations cause the emitter to vibrate at a different vibration frequency than the receiver. The differential vibratory movement of the transmitter relative to the receiver produces a variation in the signal received by the receiver that is identified by the controller. In another embodiment, the emitter pulses the signal such that the frequency of the vibration can be determined.

A recording device is preferably in communication with the controller to record the variation in the signal. By recording the signal, the present invention provides an inexpensive diagnostic and maintenance system which can record the overall operation of a drive line under actual operational conditions. Additionally vibration trends can be determined and tracked to provide data to calculate the life of a drive line or the like.

Further, the controller identifies whether the vibration sensor experiences a predetermined acceleration and activates a warning device. In the preferred embodiment, the controller activates a transmitter, such as a radio frequency (RF) transmitter which sends a signal to a remote warning device such as a warning light.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as FIG. 1 is a general schematic representation of the drive line vibration sensor according to the present invention.

DETAILED DESCRIPTION OF THE PREFERRED EMBODIMENT

Figure 1:
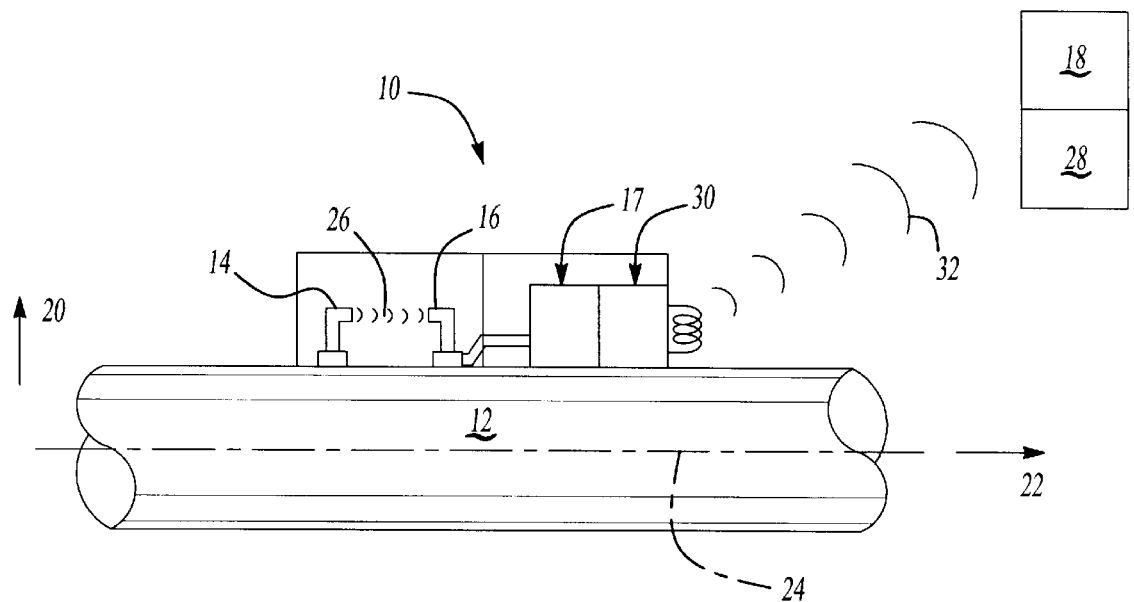

FIG. 1 illustrates a vibration sensor 10 according to the present invention. The vibration sensor 10 is preferably attachable or integral to a drive line component (shown rather schematically at 12) such as a drive shaft, connecting shaft, half-shaft or the like. The sensor 10 of the present invention is equally applicable to other types of rotating machinery or bearings that tend to become unbalanced and eventually produce undesirable vibrations.

The vibration sensor 10 of the present invention is preferably fabricated using micro machining technology in accordance with known integrated circuit technology. Although a single vibration sensor 10 is shown and described, one skilled in the art will realize that a plurality of vibration sensors 10 could be located in various locations and positions along the drive line 12 to identify vibrations from multiple locations and along several axes.

The vibration sensor 10 generally includes an emitter 14 and a receiver 16 attached to the drive line component 12. As will be more full described below, the sensor 10 measures the quantity of vibration that the drive line component 12 is exposed to such that a controller 17 can activate a warning device 18 to alert an operator when a predetermined level of vibration is encountered.

The sensor 10 is preferably positioned such that it is minimally affected by radial acceleration (shown schematically by arrow 20) yet, remains sensitive to longitudinal accelerations (shown schematically by arrow 22) along the longitudinal axis 24 of a drive line component 12.

In operation the emitter 14 transmits an electromagnetic signal (shown schematically at 26) to the receiver 16. Suitable signals can be produced in many known manners and can include fiber optic, light emitting diode, and laser emitters and receivers. The emitter 14 and receiver 16 are mounted in a differential manner such that drive line vibration causes the emitter to vibrate at a different frequency than the receiver 16. Either the emitter 14 or the receiver 16 can be isolated from the vibration by a resilient material such as a rubber pad or the like. By isolating either the emitter 14 or the receiver 16, a differential movement is again available to identify the drive line vibration.

The differential movement of the transmitter 14 relative to the receiver 16 produces an amplitude variation in the signal 26 received by the receiver 16. The controller 17 can then identify the amplitude variation in the signal 26. Control and identification can be provided by signal processing circuitry well known in the art of processing signal outputs from optical interferometers. That is, the magnitude of the differential in the signal reading can be experimentally related to an amount of vibration. Thus, the signal can be correlated to the amount vibration. Alternatively, the frequency of the signal 26 received by the receiver 16 can be directly related to the level of vibration experienced by the sensor 10. A pair of vibrating plates, well known in the art of acceleration sensors, can be used to produce a variable frequency proportional to the vibration level.

A recording device 28 is preferably in communication with the controller 17 to record the variation in the signal 26. By recording the signal 26, the present invention provides an inexpensive diagnostic and maintenance system which can record the overall operation of a drive line under actual operational conditions. Additionally vibration trends can be determined and tracked to provide data to calculate the life of a drive line or the like.

In the preferred embodiment, the controller 17 communicates with a remote recording device 28. The controller 17 preferably communicates with the recording device 28 by a transmitter 30, such as a radio frequency (RF) transmitter which sends a signal 32 to the recording device 28 and with the warning device 18. The warning device 18 alerts an operator when a predetermined level of vibration is encountered and the recording device can then be accessed to obtain a record of the vibration.

Figure 2:
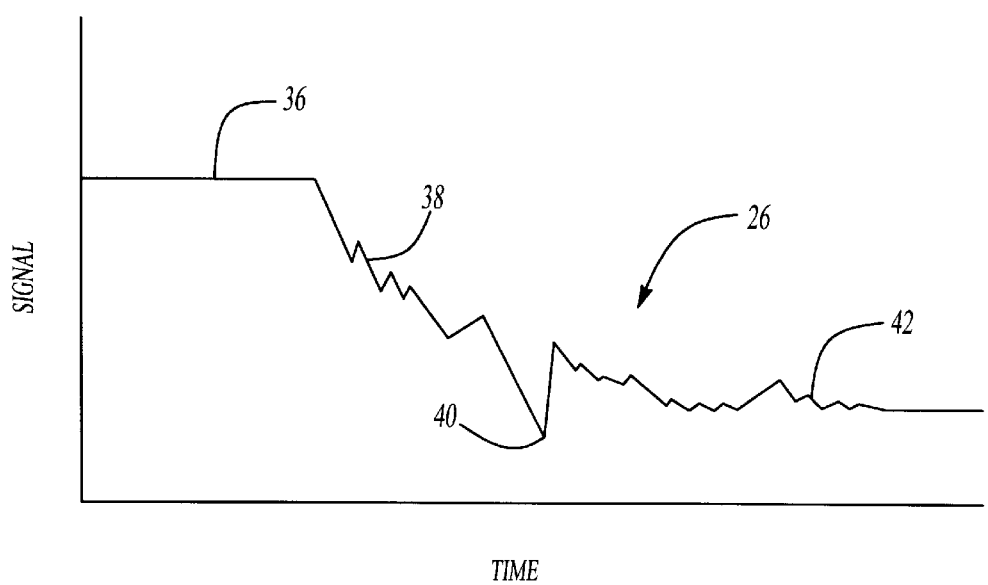
FIG. 2 is a graphical representation of a signal produced by the present invention.

FIG. 2, provides a graphical representation of the signal 26 as received by the receiver 16 and interpreted by the controller 17. During low vibration, the received signal 26 provides a high, substantially constant signal as shown by signal portion 36. As more vibration enters the drive line system, the received signal begins to decrease from signal portion 36 as represented by signal portion 38. Further, if a sharp vibration is experienced by the drive line, the present invention will readily indicate such vibration, such as by a spike 40. Finally, if the level of vibration reaches a substantially constant, unacceptable level, the present invention will indicate a substantially constant low level signal as shown by signal portion 42. Signal portion 42 preferably provides that a predetermined level of vibration is encountered and that the warning device 18 (FIG. 1) should be triggered to alert an operator.

In another embodiment, the emitter pulses the signal. The pulsed signal provides a time component or a digitized signal to the signal. The pulsed signal can be used to determine the frequency of the vibration experience by the drive line. As the transmitter 14 vibrates relative to the receiver 16, the signal 26 will further undergo the Doppler effect. The Doppler shift in the frequency of the signal 26 transmitted between the transmitter 14 and the receiver 16 can then be directly related to the magnitude and direction of the vibration.

The present invention thus provides a low cost system for monitoring vibrations and identifying a problem vibration level.

The foregoing description is to be exemplary rather than defined by the limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive line comprising:

a drive line component;

an emitter, said emitter transmitting a signal;

a receiver to receive said signal;

one of said emitter and receiver is attached to said drive line component to more he vibratable in response to vibration of said drive line component then the other of said emitter and receiver, which is attached to said drive line component to he substantially non-vibratable in response to said vibration of said drive line component vibration of said drive line component causing differential movement of said emitter relative to said receiver to produce a variation in said signal received by said receiver; and a controller in communication with said receiver, said controller operable to identify said variation in said signal, and said variation in said signal corresponds to said vibration of said drive line component.

2. The drive line as recited in claim 1, wherein said emitter is attached to said component such that said emitter is vibratable in response to said vibration of said drive line component and said receiver is substantially non-vibratable in response to said vibration of said drive line component.

3. The drive line as recited in claim 1, wherein said receiver is attached to said component such that said receiver is vibratable in response to said vibration of said drive line component and said emitter is substantially non-vibratable in response to said vibration of said drive line component.

4. The drive line as recited in claim 1, wherein said controller is operable to identify a Doppler shift in the frequency of said signal received by said receiver.

5. The drive line as recited in claim 1, further comprising a recording device in communication with said controller, said recording device operable to record said variation in said signal.

6. The drive line as recited in claim 5, further comprising an RF transmitter in communication with said controller, said RF transmitter in communication with said recording device.

7. The drive line as recited in claim 1, wherein said emitter transmits said signal as a pulse.

8. The drive line as recited in claim 1, wherein said emitter emits an electromagnetic signal.

9. A drive line assembly comprising:

a drive line including a shaft;

an emitter, said emitter transmitting an electromagnetic signal;

a receiver to receive said signal;

one of said emitter and receiver is attached to said shaft to he more vibratable in response to vibration of said shaft then the other of said emitter and receiver, which is attached to said shaft to he substantially non-vibratable in response to said vibration of said shaft, vibration of said shaft causing differential movement of said emitter relative to said receiver to produce a variation in said signal received by said receiver;

a controller in communication with said receiver, said controller operable to identify said variation in said signal; and a recording device in communication with said controller, said recording device operable to record said variation in said signal and said variation in said signal corresponds to said vibration of said shaft.

10. The drive line as recited in claim 9, wherein said emitter is attached to said component such that said emitter is vibratable in response to said vibration of said shaft and said receiver is substantially non-vibratable in response to said vibration of said shaft.

11. The drive line as recited in claim 9, wherein said receiver is attached to said shaft such that said receiver is vibratable in response to said vibration of said shaft and said emitter is substantially non-vibratable in response to said vibration of said shaft.

12. The drive line as recited in claim 9, wherein said emitter, said receiver, and said controller are integral to said shaft.

13. A method of measuring drive line vibration comprising the steps of:
   (1) attaching an emitter and a receiver to said drive line, such that one of said emitter and receiver is attached to said drive line to he more vibratable in responds to vibration of said drive line then the other of said emitter and receiver, which is attached to said drive line to he substantially non-vibratable in response to said vibration of said drive line component;
   (2) transmitting an signal from said emitter to said receiver, vibration of said drive line causing differential movement of said emitter relative to said receiver to produce a variation in said signal received by said receiver; and
   (3) identifying said variation in said signal such that said variation in said signal corresponds to said vibration of said drive line.

14. A method as recited in claim 13, further comprising the step of recording said variation in said signal.

15. A method as recited in claim 13, wherein step (2) includes pulsing said signal.

16. A method as recited in claim 13, wherein step (3) includes identifying the Doppler shift in the frequency of said signal.

* * * * *